United States Patent [19]

Abed et al.

[11] Patent Number: 5,320,815

[45] Date of Patent: Jun. 14, 1994

[54] FLUIDIZED BED PROCESS

[75] Inventors: Ran Abed; James W. Reeves, both of Wilmington, Del.

[73] Assignee: E. I. Du Pont de Nemours and Company, Wilmington, Del.

[21] Appl. No.: 954,410

[22] Filed: Sep. 30, 1992

Related U.S. Application Data

[63] Continuation of Ser. No. 668,750, Mar. 13, 1991, abandoned, which is a continuation of Ser. No. 540,463, Jun. 19, 1990, abandoned, which is a continuation of Ser. No. 73,233, Jul. 13, 1987, abandoned.

[51] Int. Cl.$^5$ .............. B01J 8/24; C01G 23/02; C01G 49/10
[52] U.S. Cl. .................. 423/74; 422/145; 423/148; 423/492; 423/DIG. 16
[58] Field of Search ............ 422/145; 423/74, 148, 423/492, DIG. 16

[56] References Cited

U.S. PATENT DOCUMENTS

| | | | |
|---|---|---|---|
| 2,596,954 | 5/1952 | Heath | 423/148 |
| 2,701,179 | 2/1955 | McKinney | 423/87 |
| 3,607,062 | 9/1971 | Sudduth | 422/145 |
| 4,552,203 | 11/1985 | Chrysostome et al. | 422/145 |
| 4,817,540 | 4/1989 | Razbin et al. | 422/145 |

FOREIGN PATENT DOCUMENTS

| | | | |
|---|---|---|---|
| 495102 | 1/1977 | Australia | 422/145 |
| 90/04569 | 5/1990 | World Int. Prop. O. | |

OTHER PUBLICATIONS

Botterill, *Fluid-Bed Heat Transfer*, Academic Press, 1975, pp. 130–132, 134–140.
U.S. Ser. No. 07/073,234.
Glasser et al., "Fluidized Bed Chlorination of Rutile", Society of Mining Engineers Fall Meeting, Gatlinburg, Tenn., Sep. 9–12, 1962.
Yang, "A Study of Fine Particle Residence Time in a Jetting Fluidized Bed", FE-31063-8-1985.
Themilis et al., "Fluidized Bed Behavior in Zinc Roasters", Journal of Metals.
Harris et al., "Fluidized Coke-Bed Chlorinator of Ilmenites", Dept. of Intertior, Investigation Report 8165.

*Primary Examiner*—Jeffrey E. Russel

[57] ABSTRACT

In a fluidized bed process having a bed of fluidized particulate material which is susceptible to having at least some of the particulate material being entrained in the gases exiting the bed, the entrainment is reduced by introducing the particulate material into the process, in the substantial absence of a gas which transports the particulate material, at one or more points which are below the surface of the bed of fluidized particulate material.

6 Claims, No Drawings

FLUIDIZED BED PROCESS

This is a continuation of application Ser. No. 07/668,750 filed Mar. 13, 1991, now abandoned, which is a continuation of application Ser. No. 07/540,463 filed Jun. 19, 1990, now abandoned, which is a continuation of application Ser. No. 07/073,233 filed Jul. 13, 1987, now abandoned.

BACKGROUND OF THE INVENTION

This invention relates to an improved fluidized bed process.

Fluidized bed processes are used commercially for the chlorination of titanium containing materials, ore roasting or refining, combustion of solid carbonaceous material such as coal, etc.

In such processes, particulate material, air, oxygen or other oxidizing agents are fed into a reaction chamber, and suitable temperature and pressure are maintained. The flow rates are adjusted so that the particulate material becomes fluidized, i.e., it is maintained in a state of suspension and has the appearance of boiling.

A good example of a commercial fluidized bed process is that for chlorinating titanium containing material. In such process, particulate coke, particulate titanium containing material, chlorine and optionally oxygen or air are fed into a reaction chamber, and a suitable reaction temperature, pressure and flow rates are maintained to sustain the fluidized bed. Gaseous titanium tetrachloride and other metal chlorides are exhausted from the reactor chamber. The gaseous titanium tetrachloride so produced can then be separated from the other metal chlorides and used to produce titanium dioxide pigment or titanium metal.

A problem, however, which has not been satisfactorily solved in the foregoing fluidized bed processes is that particulate material of fine size tends to becomes entrained in the hot gases exiting the process. As a consequence, such fine particulates have a short residence time in the reaction zone of the process, and often exit the reactor in an unreacted state. While the fine particulates can be recycled to the process, they still tend to exit before reacting and therefore generally must be removed from the process. The unreacted fines therefore are a disposal problem and a waste of the fuel, metallic, or other values in the materials being processed.

The fine particulate material typically is present due to the attrition and degradation of particulate materials of larger particle size which are fed to the fluidized bed process. However, it would be desirable to be able to feed fine particulate material to the process because it often is abundant and less expensive than materials having larger particle size. For example, there exists abundant quantities of relatively inexpensive titanium containing ore which currently cannot be economically processed because it exists in the form of sands having small particle size.

The following references are disclosed as being of interest to the subject matter of this invention:

U.S. Pat. No. 2,701,179 discloses a commercial fluidized bed process for chlorinating titanium containing material wherein the particulates are fed pneumatically with chlorine into the bottom of the fluidized bed reactor.

An article entitled, "Fluidized Bed Chlorination of Rutile", by J. Glasser and W. L. Robinson, appeared in the Sep. 9, 1962 publication of the Society of Mining Engineers of AIME. It describes a commercial fluidized bed process for chlorinating titanium containing ore wherein course particulate ore of a size greater than about 70 microns is fed to the top of a fluidized bed reactor.

U.S. Department of Energy Contract Report Fe-21063-8-1985, by W. C. Yang, and entitled, "A Study of Fine Particle Residence Time in a Jetting Fluidized Bed", discloses laboratory scale fluidized bed experiments including injecting fine particulate acrylic material into and above the fluidized bed. The experiments appear to conclude that (a) coaxial pneumatic injection below the bed is less desirable than radial pneumatic injection above or below the bed, and (b) radial pneumatic injection above and below the bed produced similar results.

An article entitled, "Fluid Bed Behavior in Zinc Roasters", by N. J. Themelis and G. M. Freeman appeared in the August 1984 issue of the Journal of Metals. It discloses the commercial fluidized bed roasting of zinc ores wherein the ore is fed to the reactor above the fluidized bed.

The U.S. Bureau of Mines report No. 8165 was authored by H. M. Harris, A. M. Henderson and T. T. Campbell. It is entitled, "Fluidized Coke Bed Chlorination of Ilmenites" and discloses pneumatic feed, below the fluidized bed, of titanium containing ores and coke. A laboratory scale reaction is used.

SUMMARY OF THE INVENTION

The following summarizes this invention:

In a fluidized bed process having a bed of fluidized particulate material which is susceptible to having at least some of said particulate material being entrained in the gases exiting the bed, an improvement to reduce said entrainment which comprises introducing the particulate material into the process, in the substantial absence of a gas which transports the particulate material, at one or more points which are below the surface of the bed of fluidized particulate material.

It has been found that the use of the improved process of this invention can substantially decrease the amount of fine particulate material which is entrained in the gases exiting the fluidized bed process. Consequently, such material becomes more completely reacted. The resulting greater reactivity lessens disposal problems, permits recycle of fine particulate material generated in the process, and allows initial use of fine particulate material which often is more abundant and less expensive than particulate material having a larger particle size.

DETAILED DESCRIPTION OF THE INVENTION

The concept of this invention can be used in any fluidized bed process which is susceptible to entrainment of fine particulate material in the gases exiting the bed. Examples of fluidized bed processes which can utilize the concept of this invention include combustion of carbonaceous material (such as coal, wood, peat, etc.), ore refining or roasting (such as chlorination of titanium containing material), and processing of metallic ores including those containing zinc, copper or iron.

The particulate material should be introduced into the process, at a point below the surface of the fluidized bed, in the substantial absence of any gas which transports the particulate material. By the term "gas which transports the particulate material" is meant gas which has a superficial velocity greater than the terminal settling velocity of the particulate material. By "superficial velocity" in this context is meant the velocity of the gas in the conduit used to feed the particulate material to the process, in the absence of such material.

Suitable feed means for the particulate material include a screw device, a gravity fed hopper, power ram device, etc. Also, any of these feed means can be used with an "L"-shaped exit pipe or exit pipe with a bend which tends to minimize back flow of particulate material due to pressure in the reactor.

While there should be a substantial absence of gas which transports the particulate material, sufficient amounts of gas such as air, nitrogen, chlorine, etc. can be injected into the particulate material being fed to the process to act as a lubricant or agent to lessen the binding of such particulate material. The presence of such gas acting as a lubricant or agent to lessen the binding of the particulate material can thereby help to control the flow rate of the particulate material. Ordinarily, such gas acting as a lubricant or such agent should be present in an amount of about 0.001–0.1, preferably about 0.0025–0.04, and most preferably about 0.005–0.02 part by weight of gas per part by weight of particulate material and have a superficial gas velocity of about 0.1–10, preferably about 0.5–5, and most preferably about 0.75–3 feet per second. It should be understood that the amount of such gas acting as a lubricant or such agent and its velocity will depend upon the particle size, particle density, and particle shape, and gas density. Suitable amounts of such gas and its velocity can readily be determined by empirical testing with a device such as was used in the Example. If such gas acting as a lubricant or such agent is used in conjunction with an "L" valve or pipe with a bend, preferably such gas should be injected at or near the vacinity of the 90° "L" or bend.

The particle size of the particulate material which is susceptible to entrainment can vary depending upon its terminal settling velocity and the superficial velocity of the gases in the fluidized bed, i.e., the velocity of the gases in the fluidized bed reactor in the absence of particulates. Generally, when the terminal settling velocity of a particle is less than that of the superficial velocity of the gases in the bed, then it usually will be entrained in the gases. For ore roasting or refining (including chlorination of titanium containing ore), the particulate material which is entrained usually has a particle size of less than about 70 microns. For combustion of carbonaceous materials such as coal, the particulate material which becomes entrained also typically has a particle size of less than about 70 microns.

The source of the material which is susceptible to entrainment can be that generated by the degradation or attrition in the fluidized bed process of material having a particle size in excess of about 70 microns. In such case, the material so generated will generally be entrained in the hot gases exiting the process and can be removed by a cyclone or other separator and recycled to the process. Alternatively or in addition, the source of the material having a particle size of less than about 70 microns can be material having such particle size which is initially fed to the process.

The fluidized bed process for combusting carbonaceous material is known and is described, for example, in the text "Fluidized Beds, Combustion and Applications", edited by J. R. Howard and published by Applied Science Publishers in 1983. Such text is hereby incorporated by reference.

Particulate limestone can also be included in the fluidized bed to control the emission of sulfur oxides and/or other pollutants.

The fluidized bed process for roasting zinc ores is described in the article entitled, "Fluidized Bed Behavior in Zinc Roasters", which is summarized in the Background of the Invention. It is hereby incorporated by reference. Similar processes can be used to roast other metallic bearing ores.

The fluidized bed process for chlorinating titanium containing ore is known and is described, for example, in U.S. Pat. No. 2,701,179 and in the article "Fluidized Bed Chlorination of Rutile", which is summarized in the Background of the Invention. Both such patent and article are hereby incorporated by reference.

Typical conditions for commercial fluidized beds for chlorinating titanium containing material are as follows: reaction temperature of about 900°–1300° C., pressure of about 1.5–3 atmospheres, reactor size of about 6–25 feet in diameter with multiple chlorine jets in the base, reactor superficial velocity of about 0.5–1.5 feet per second, and a settled bed depth of about 6–25 feet. Typically, the titanium containing material initially fed has a particle size of about 70–800 microns in diameter and the coke initially fed has a particle size of about 300–3000 microns in diameter.

The titanium containing material can be any suitable titanium-bearing source material such as titanium containing ores including rutile, ilmenite or anatase ore; beneficates thereof; titanium containing by-products or slags; and mixtures thereof.

The coke which is suitable for use in the fluidized bed process for chlorinating titanium containing material is any carbonaceous material which has been subjected to a coking process. Preferred is coke or calcined coke which is derived from petroleum, or coal or mixtures of such cokes.

Preferably, at least part of the coke and/or titanium containing material used in this invention should have a fine particle size, i.e. a diameter of less than about 70, more preferably, less than about 60, and most preferably less than about 50 microns. It should be understood that the source of such fine particle coke and/or material can be that generated by the degradation or attrition in the process of titanium containing material and/or coke, having a particle size in excess of about 70 microns. In such case, the fine particle coke and/or material so generated will tend to be entrained in the hot gases exiting the process, and can be removed by a cyclone or other separator and recycled to the process. Alternatively or in addition, the source of the fine particle coke and/or material can be such fine particulate coke or material which is initially fed to the process.

The following example illustrates, but does not limit, the concept of this invention.

EXAMPLE

The influence on pneumatic versus nonpnuematic feed of fine particle material in a fluidized bed simulated reactor was evaluated. The simulated reactor was 3 feet in diameter by 23 feed high and had a settled bed height of 6 feet. The particulate feed stream material was 97 weight percent silica sand (mean particle size of 250 microns in diameter) and 3 weight percent fluid cracking catalyst (mean particle size of 30 microns in diameter). Such particulate material was fed continuously at the rate of 500 pounds per hour through a one inch diameter nozzle located 2 feet up from the base of the simulated reactor.

For the runs with pneumatic feed, air at the rate of 250 pounds per hour was used, which transported the particulate material to the simulated reactor. For the nonpneumatic feed, the particulate material was introduced via gravity feed through a hopper having an exit pipe with a 90° bend, i.e., an "L" valve. With the nonpneumatic feed, air at the rate of 5 pounds per hour was injected at the point of the 90° bend; such air substantially did not transport the particulate material, but rather lessened the binding of the particulate material so that the gravity feed would function without particle blockage or hold-up.

For each run, sodium chloride tracer (having a mean particle size of 30 microns in diameter) was fed into the particulate feed stream over a 20-second period. The runs made were for pneumatic and nonpneumatic feed for fluidized bed superficial velocities of 0.6, 0.75, 0.90 and 1.05 feet per second.

The influence of fine particulate material was determined by measuring the rate at which the sodium chloride tracer was entrained from the bed. This was done by collecting all entrained particulate material (i.e., contained in the air exiting the simulated reactor) with a high-efficiency cyclone and weighing and analyzing for the tracer over timed intervals. The results of these analyses are shown in the Table, which sets forth the entrainment times for cumulative percentages of sodium chloride for nonpneumatic feed and the pneumatic feed. The cumulative percentages were 5, 10, 15, 20 and 25 percent, measured at simulated reactor gas superficial velocities of 0.6, 0.75, 0.9 and 1.05 feet per second. The data show that the time required for sodium chloride entrainment for nonpneumatic feed was greater than that for the pneumatic feed in all cases. This means that the fine particles are retained in the fluidized bed for longer times with the nonpneumatic feed.

TABLE

Entrainment Times for Cumulative Weight Percentages of NaCl Tracer Pneumatic versus Nonpneumatic Feed

| Superficial Gas Velocity FT/SEC | Feed* | 5 | 10 | 15 | 20 | 25** |
|---|---|---|---|---|---|---|
| 0.6 | NP | 105.4 | 160 | 213 | 271 | 336*** |
|  | P | 70.8 | 111.7 | 152.8 | 198 | 255*** |
| 0.75 | NP | 66 | 111.7 | 152.8 | 198 | 255*** |
|  | P | 36.3 | 59.3 | 81.7 | 107.1 | 134.8*** |
| 0.9 | NP | 45.6 | 66.9 | 86.5 | 108.2 | 131.2*** |
|  | P | 24.6 | 41.7 | 59 | 76.9 | 97.1*** |
| 1.05 | NP | 41.2 | 59.6 | 77.5 | 95.8 | 115*** |
|  | P | 27.8 | 43.6 | 58.5 | 74.2 | 91.0*** |

*NP = nonpneumatic
P = pneumatic
**Cumulative weight percent
***Seconds

What is claimed is:

1. Method for reducing the entrainment of particulate material, having a particle size of less than about 70 microns, in the gases exiting a fluidized bed process for chlorinating titanium containing material comprising:
   introducing the particulate material into the process in the substantial absence of a gas which transports the particulate material, at on or more points which are below the surface of the bed of fluidized particulate material and wherein (a) gas in the amount of about 0.001–0.01 part by weight of gas per part by weight of particulate material is utilized in the introduction of the particulate material to the process, and (b) such gas has a superficial gas velocity of about 0.1–10 feet per second such gas acting as a lubricant or an agent to lessen the binding of the particulate material.

2. The process of claim 1 wherein some of the particulate material is coke.

3. The process of claim 2 wherein the titanium containing material is titanium containing ore, beneficates of titanium containing ores, titanium-containing by-products or slags or mixtures thereof.

4. The process of claim 1 wherein the particulate material comprises solid carbonaceous material.

5. The process of any one of claims 1, 2, 3 or 4 wherein an L valve or a pipe with a bend is utilized in the introduction of the particulate material into the process.

6. The process of any one of the preceding claims 1, 2, 3 or 4 wherein gas is present in an amount of about 0.0025–0.04 parts by weight of gas per part by weight of particulate material, and such gas has a superficial gas velocity of about 0.5–5 feet per second.

* * * * *